(12) United States Patent
Michals et al.

(10) Patent No.: US 11,275,349 B2
(45) Date of Patent: Mar. 15, 2022

(54) BUILDING AUTOMATION SYSTEMS WITH AUTOMATIC METADATA TAGGING

(71) Applicant: Johnson Controls Technology Company, Auburn Hills, MI (US)

(72) Inventors: Steven A. Michals, Germantown, WI (US); Mary Philomena Boelk, Wauwatosa, WI (US); Jeffrey D. Horvath, Brookfield, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 365 days.

(21) Appl. No.: 16/261,491

(22) Filed: Jan. 29, 2019

(65) Prior Publication Data

US 2019/0235455 A1    Aug. 1, 2019

Related U.S. Application Data

(60) Provisional application No. 62/625,101, filed on Feb. 1, 2018.

(51) Int. Cl.
*G06F 16/22* (2019.01)
*G05B 19/042* (2006.01)

(52) U.S. Cl.
CPC .... *G05B 19/042* (2013.01); *G05B 2219/2614* (2013.01); *G05B 2219/2642* (2013.01)

(58) Field of Classification Search
CPC ....... G06F 16/48; G06F 16/22; G06F 16/7867
See application file for complete search history.

(56) References Cited

U.S. PATENT DOCUMENTS

| | | | |
|---|---|---|---|
| 2014/0058539 A1* | 2/2014 | Park | G05B 13/0265 700/50 |
| 2015/0293508 A1* | 10/2015 | Piaskowski | G05B 15/02 700/275 |
| 2017/0003668 A1* | 1/2017 | Burt | G05B 19/042 |

\* cited by examiner

*Primary Examiner* — Etienne P Leroux
*Assistant Examiner* — Cindy Nguyen
(74) *Attorney, Agent, or Firm* — Foley & Lardner LLP

(57) ABSTRACT

A method for tagging entities in a building automation system (BAS), the method including identifying, by a processing circuit, a first entity of one or more entities in a system library in response to receiving an indication to add the one or more entities to the BAS, wherein the system library includes a number of relationships between a number of tags and a number of entities. The method further including determining, by the processing circuit, one or more tags associated with the first entity based on the system library, determining, by the processing circuit, a tag type for each of the one or more tags based on a tag dictionary, and adding, by the processing circuit, the one or more tags to the first entity based on the tag type of each of the one or more tags.

20 Claims, 14 Drawing Sheets

FX System Library Editor

Library Information | Graphic Info | Library Points

File Name: file:/c:/Niagara/Niagara-4.4.73.24/jciStandards/PCT-VAV-SD.xml
Optional Starting APD, CSV or CAF File Library Description: VAV Single Duct Author Name: Milw Version Date: 11/13/2015

PCT Version Number: 10.1
If multiple tags separate with semicolons
assign values with equals.
Example hs:cool;hs:stage=2

Tags for System: hs:vav

Library Type: PCT based

[Save] [Save As...]

FIG. 12

FX System Library Editor

Library Information | Graphic Info | Library Points

Library Points for: System Library 214 object

| Import | Alarm | Totalization | COV Trend | COV Tolerance | Interval Trend | Interval (Minutes) | PCT Name | Condition 1 Test | Condition 2 Test | Export | Point Order | Bacnet Property | Tags |
|---|---|---|---|---|---|---|---|---|---|---|---|---|---|
| ✓ | | | | | | | UNITEN-MODE | | | | 10 | | hs:kind=mode,unit;hs:enable;hs:cmd |
| ✓ | | | | | | | OCC-S | | | | 20 | | hs:occupied;hs:sensor |
| ✓ | | | | | ✓ | 15 | OCC-SCHEDULE | | | | 30 | | hs:occupied;hs:kind=shedule |
| ✓ | | | | | | | EFF-OCC | | | | 40 | | hs:occ;hs:effective |
| ✓ | | | | | ✓ | 15 | ZN-T | | | | 50 | | hs:air;hs:zone;sensor;hs:temp |
| ✓ | | | | | | | ZN-H | | | | 60 | | hs:air;hs:zone;hs:sensor;hs:humidity |
| ✓ | | | | | | | ZN-Q | | | | 70 | | hs:air;hs:zone;hs:sensor;hs:co2 |
| | | | | | | | EFFCLG-SP | | | | 80 | | hs:cooling;hs:sp;hs:effective |

☐ Totalization
Trend
☐ Interval Trend
Interval(Minutes)
☐ COV Trend
COV Tolerance
Condition 1 Test
Condition 2 Test
Point Order(Integer) 20
Tags hs:occupied;hs:sensor
☐ Export
Bacnet property

[New] [Delete] [Reset] [Save]

BUILDING AUTOMATION SYSTEMS WITH AUTOMATIC METADATA TAGGING

CROSS-REFERENCE TO RELATED APPLICATIONS

This application claims the benefit of U.S. Provisional. Patent Application No. 62/625,101 filed on Feb. 1, 2018, entitled: "Building Automation Systems with Automatic Metadata Tagging," the entire contents of which are hereby incorporated by reference herein.

BACKGROUND

The present disclosure relates generally to a building management system (BMS) and more particularly to classifying entities within a BMS using metadata tagging.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices can be installed in any environment (e.g., an indoor area or an outdoor area) and the environment can include any number of buildings, spaces, zones, rooms, or areas. A BMS can include a variety of devices (e.g., HVAC devices, controllers, chillers, fans, sensors, etc.) configured to facilitate monitoring and controlling the building space. Throughout this disclosure, such devices are referred to as BMS devices or building equipment.

Advanced building management system applications sometimes rely on the classification and identification of points, devices, and entities. For example, tagging may be a valuable mechanism for associating metadata with BMS entities in a station. Herein, the term "station" refers to an instance of relevant software, which can run on a variety of hardware platforms. Some tagging applications allow a tag to be associated with an entity, either manually ("direct tags") or automatically ("implied tags").

The process of using direct tags generally requires several steps. For example, for each entity, a menu item is selected. Then a tag dictionary is selected, and from there the user selects the appropriate direct tag or tag group. The tag is added at any time after the entity is added to the station. This process can be tedious and time-consuming.

Implementing implied tags generally involves the use of a tag dictionary, which contains rules that add implied tags depending on the evaluation of that rule. This evaluation generally occurs when the entity is added to the station. This method requires sophisticated construction of the tag dictionary, and the user may lack control over which tags are added to an entity.

SUMMARY

One implementation of the present disclosure is a method for tagging entities in a building automation system (BAS), the method including identifying, by a processing circuit, a first entity of one or more entities in a system library in response to receiving an indication to add the one or more entities to the BAS system, wherein the system library includes a number of relationships between a number of tags and a number of entities. The method further including determining, by the processing circuit, one or more tags associated with the first entity based on the system library, determining, by the processing circuit, a tag type for each of the one or more tags based on a tag dictionary, and adding, by the processing circuit, the one or more tags to the first entity based on the tag type of each of the one or more tags.

In some embodiments the method further includes verifying the one or more tags, wherein verifying the one or more tags includes comparing the one or more tags to the number of tags in the system library. In some embodiments the processing circuit omits adding duplicate tags to the first entity based on the comparison. In some embodiments a user interface produces the indication to add the one or more entities to the BAS system. In some embodiments the first entity includes one of a space, a piece of equipment, a sensor, a device, or a point. In some embodiments the tag type is a value tag, wherein a value tag further includes a numeric value associated with the first entity. In some embodiments the method further includes adding, by the processing circuit, the numeric value to the first entity.

Another implementation of the present disclosure is a method for converting tag syntax in a building management system (BMS), the method including receiving, by a processing circuit, a first tag corresponding to a first entity and having a first syntax, identifying, by the processing circuit, a system library associated with the first entity, wherein the system library includes a number of relationships between a number of tags and a number of entities. The method further includes initiating, by the processing circuit, an update process, the process including building one or more second tags corresponding to the first entity and having a second syntax.

In some embodiments building the one or more second tags includes determining one or more second tags associated with the first entity based on the system library, determining a tag type for each of the one or more second tags based on a tag dictionary, and adding the one or more second tags to the first entity based on a tag type of each of the one or more second tags. In some embodiments the method further includes verifying the one or more second tags, wherein verifying the one or more second tags includes comparing the one or more second tags to the number of tags in the system library. In some embodiments duplicate tags are omitted from addition to the first entity based on the comparison. In some embodiments the first entity includes one of a space, a piece of equipment, a sensor, a device, or a point. In some embodiments the tag type is a value tag, wherein a value tag further includes a numeric value associated with the first entity. In some embodiments the method further includes adding, by the processing circuit, the numeric value to the first entity.

Another implementation of the present disclosure is a building automation system (BAS) including a system library including a number of relationships between a number of tags and a number of entities. The BAS further includes a computing system coupled to the system library configured to perform a first import process and a second update process, wherein the first import process associates one or more tags with a first entity, and wherein the second update process updates a first tag associated with a second entity by building one or more second tags.

In some embodiments the first import process includes identifying the first entity in the system library, determining the one or more tags associated with the first entity based on the system library, determining a tag type for each of the one or more tags based on a tag dictionary, and adding the one or more tags to the first entity based on the tag type of each of the one or more tags. In some embodiments the second update process includes receiving the first tag corresponding to the second entity and having a first syntax, identifying a system type associated with the second entity, wherein the system type is associated with the number of relationships in the system library, and building one or more second tags corresponding to the second entity and having a second syntax. In some embodiments, building the one or more second tags includes determining the one or more second tags associated with the second entity based on the system library, determining a tag type for each of the one or more second tags based on a tag dictionary, and adding the one or more second tags to the second entity based on the tag type of each of the one or more second tags. In some embodiments the tag type is a value tag, wherein a value tag further includes a numeric value associated with the second entity. In some embodiments the first entity includes one of a space, a piece of equipment, a sensor, a device, or a point.

BRIEF DESCRIPTION OF THE DRAWINGS

FIG. 12 is an image of an example interface for editing a system library, according to some embodiments.

FIG. 13 is an image of an example interface for editing points within a system library, according to some embodiments.

DETAILED DESCRIPTION

Before turning to the Figures, it should be understood that the disclosure is not limited to the details or methodology set forth in the description or illustrated in the figures. It should also be understood that the terminology is for the purpose of description only and should not be regarded as limiting.

Referring generally to the Figures, a computing system for automatically tagging entities in a building automation system (BMS) is shown and described. The computing system may be utilized in conjunction with a plurality of building automation or management systems, subsystems, or as a part high level building automation system. For example, the computer system may be a part of a Johnson Controls Facility Explorer system. Devices and control points are central to many building management systems, as well as to the construction of a station. Accordingly, the present disclosure emphasizes devices and control points ("points") when automatically adding tags.

The present disclosure describes systems and methods that address the shortcomings of conventional systems. For example, embodiments of the computing system disclosed herein can be configured to combine the flexibility of direct tagging techniques with the efficiency of implied tagging techniques. Accordingly, embodiments of the present disclosure describes several mechanisms for tags to be added automatically, along with ways for users to conveniently modify which tags are added by default. Furthermore, embodiments of the systems and methods disclosed herein describe techniques for facilitating use of tags in multiple software platforms, for example by converting previously-created tags to a format compatible with other software platforms.

Building HVAC Systems and Building Management Systems

Figure 1:
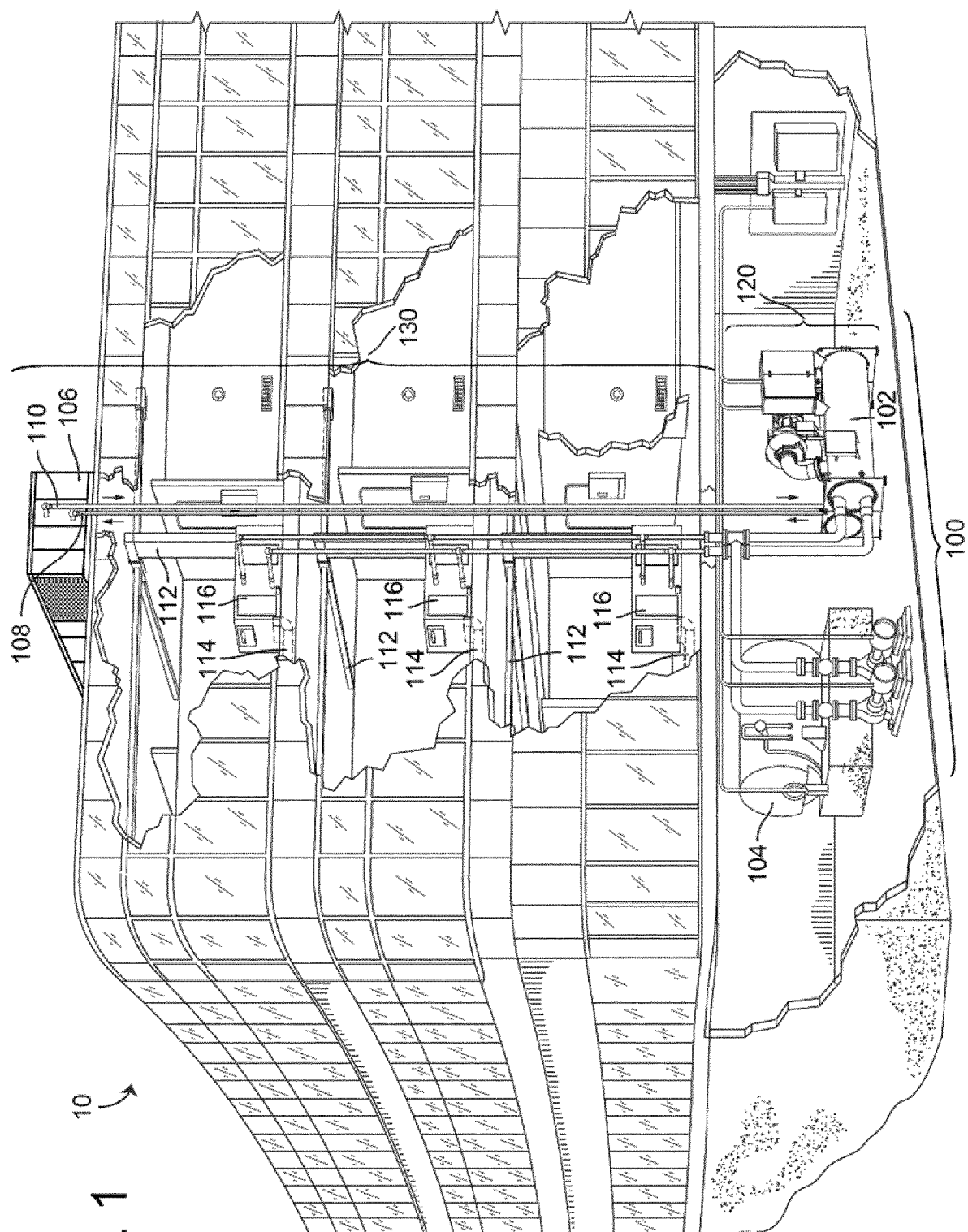
FIG. 1 is a drawing of a building equipped with a HVAC system, according to some embodiments.
Figure 2:
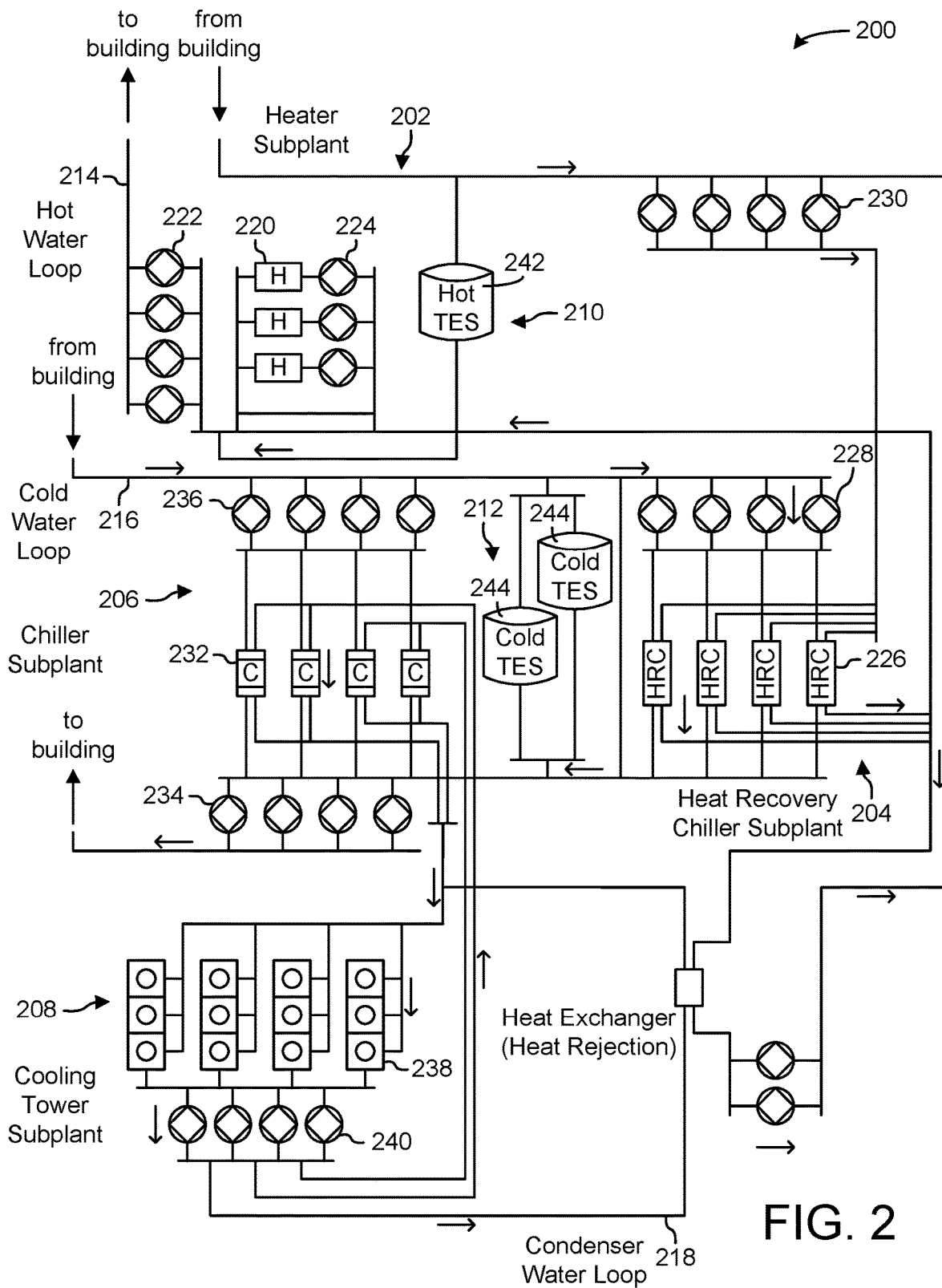
FIG. 2 is a block diagram of a waterside system which can be used to serve the building of FIG. 1, according to some embodiments.
Figure 3:
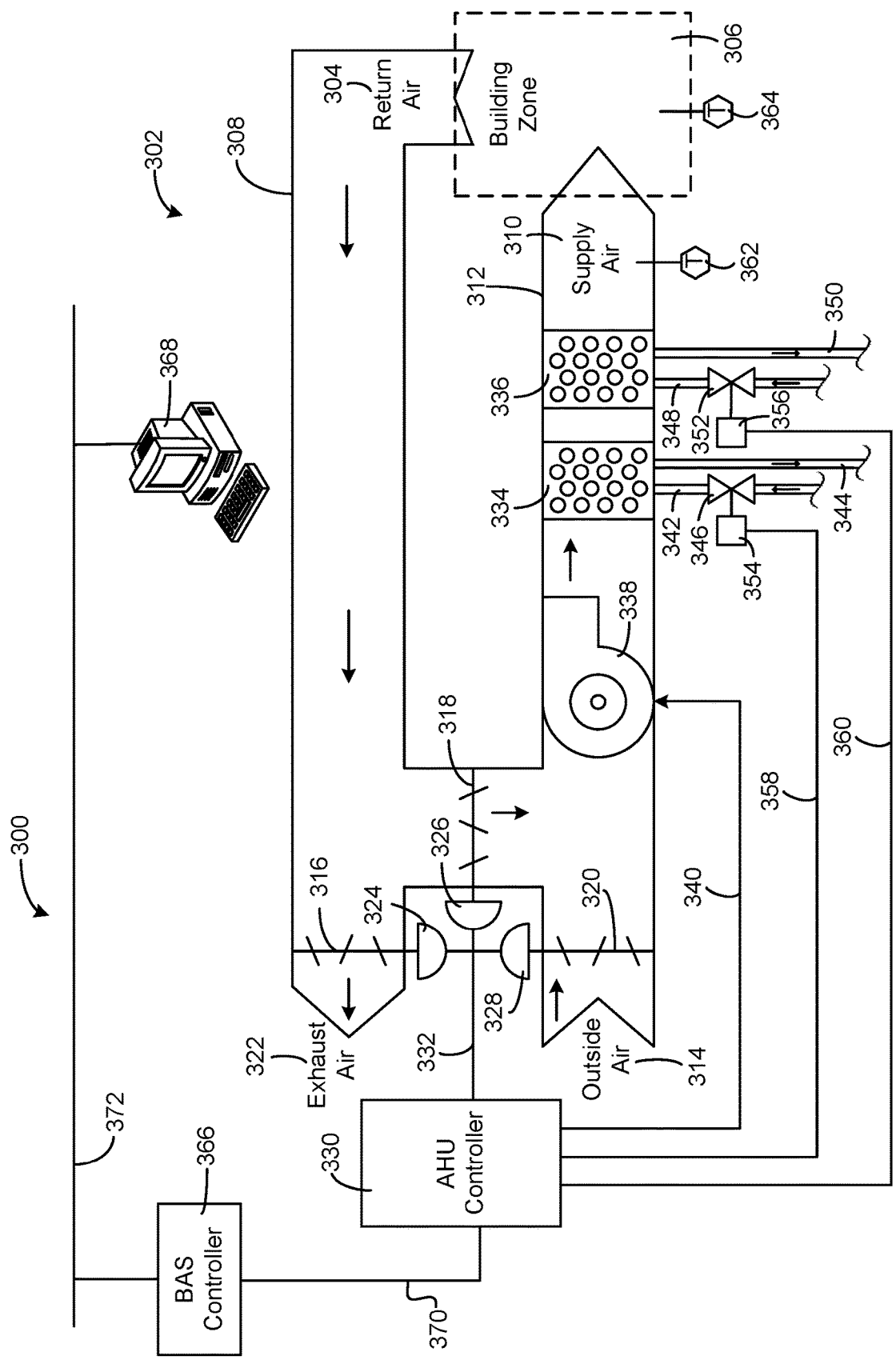
FIG. 3 is a block diagram of an airside system which can be used to serve the building of FIG. 1, according to some embodiments.
Figure 4:
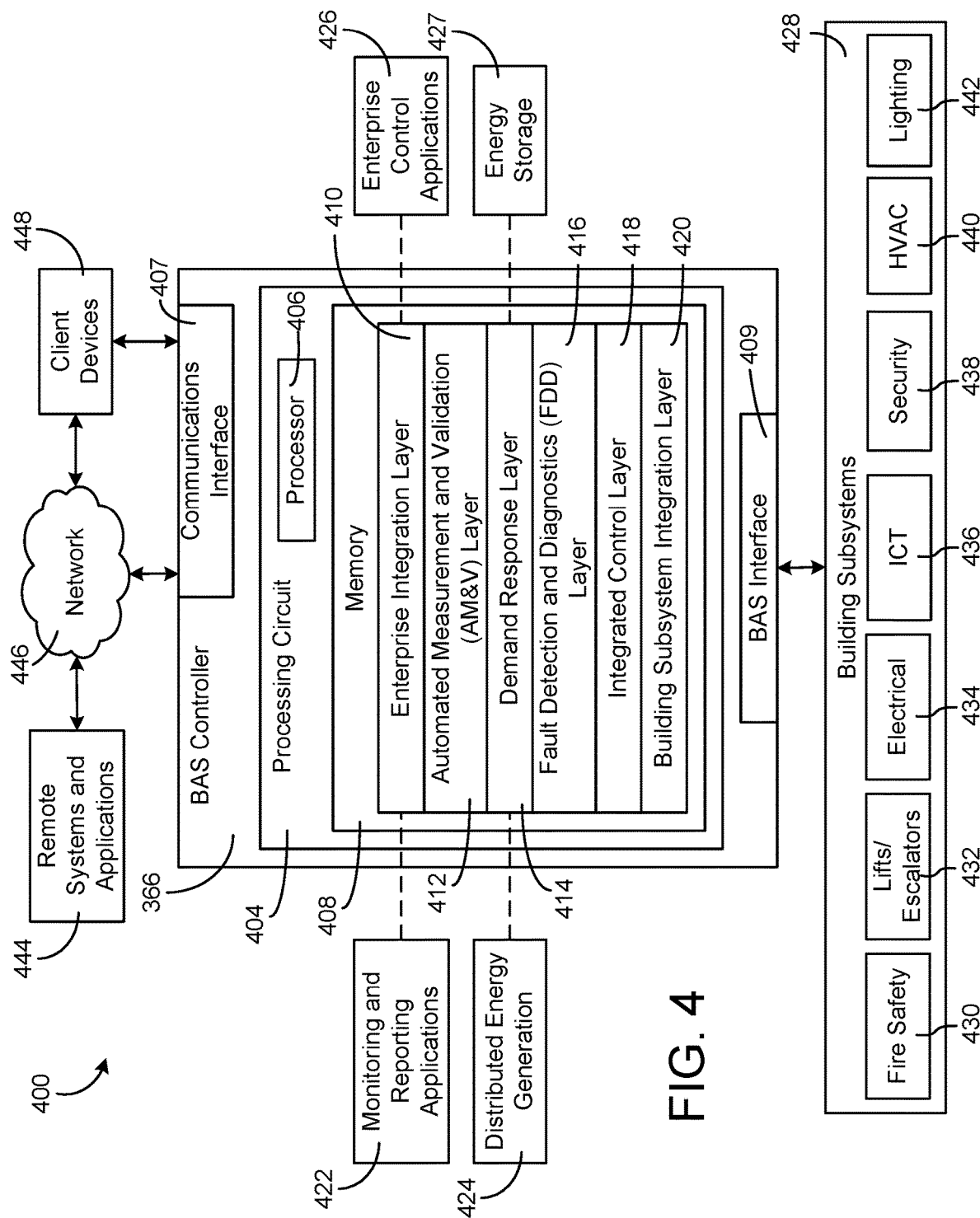
FIG. 4 is a block diagram of a building management system (BMS) which can be used to monitor and control the building of FIG. 1, according to some embodiments.
Figure 5:
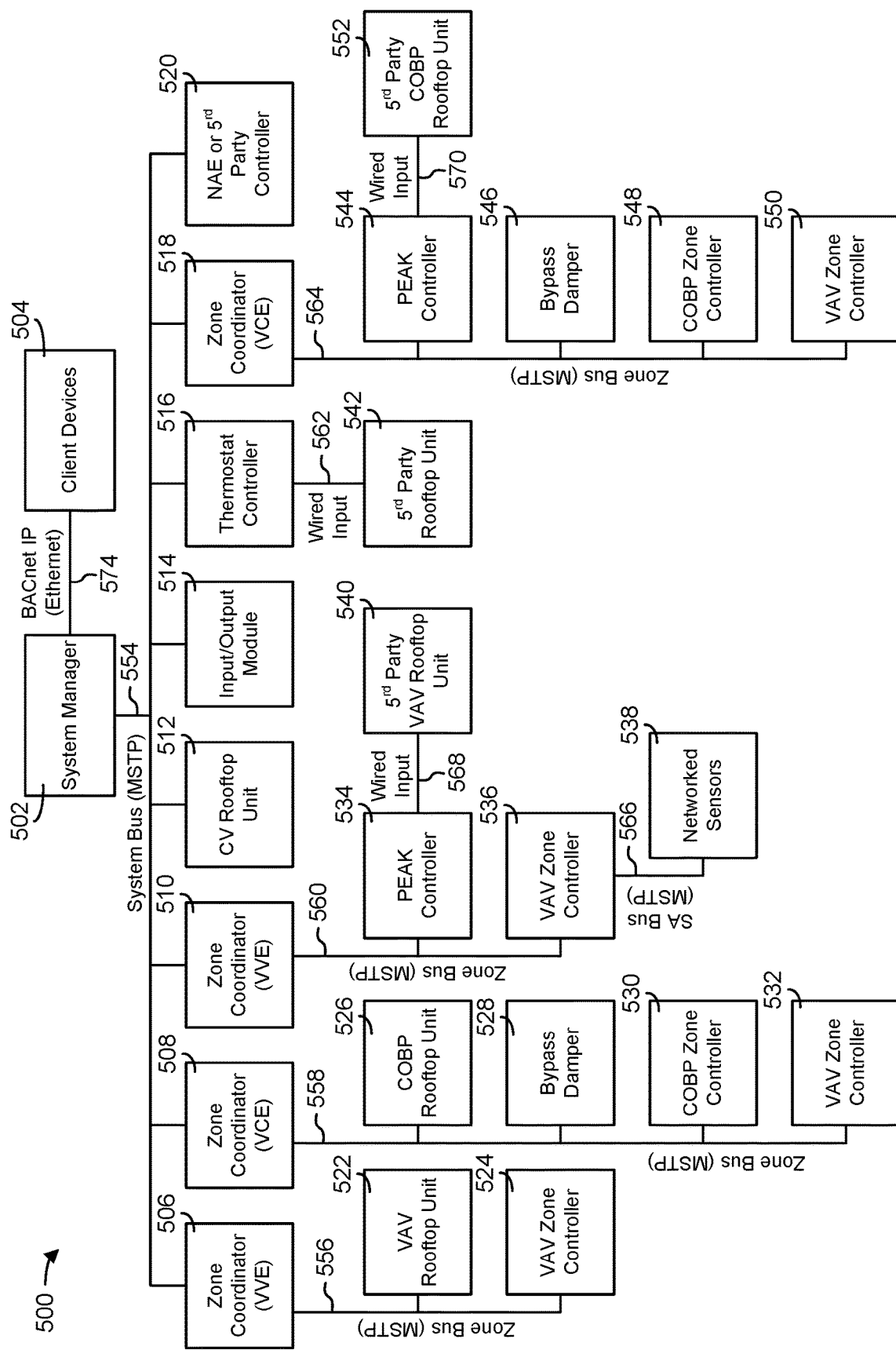
FIG. 5 is a block diagram of another building management system which can be used to monitor and control the building and HVAC system of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem.

Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify whether control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Automatic Tagging

Referring now to FIGS. 6-14, systems and methods for automatic tagging of entities within a building management system (BMS) are shown, according to some embodiments. In some embodiments, an "entity" may refer to any unit within a BMS that corresponds to data. In some embodiments, for example, entities may include spaces, equipment, sensors, devices, and points.

In some embodiments of the present disclosure, a computing system is configured to organize and associate tags with devices and points. Additionally, in some embodiments the computing system is configured to allow modification of tags that are associated with particular devices and points, based on the specific configuration that is desired. Embodiments of the computing system disclosed herein can be configured to add tags to devices and points when a standard field device is added to the station via the already existing import software or from a palette. In some embodiments, a "tag" may refer to a value to abstract equipment, spaces, and other entities of a BMS. For example, a tag may indicate an equipment type, point types used or provided by that equipment type, control relationships between point types and/or any other attributes common to that type of equipment, to name a few.

Further, embodiments of the computing system can be configured to add tags to devices and points that already exist in a station. In some embodiments, various device categories may be handled, including a standard field device that was originally added to the station with import, a standard field device that was not originally added with import, but was later added by hand or by station discovery, and a non-standard field device. In some situations, a standard field device may refer to a Johnson Controls field device, whereas a non-standard field device may refer to a field device not associated with Johnson Controls.

The automatic tagging of the present disclosure may include adding appropriate direct tags/tag groups as defined in a system library to a device, as well as adding appropriate direct tags/tag groups as defined in the system library to points. The automatic tagging may further provide that when devices are added via a palette (see, e.g., a Johnson Controls TEC3000, electric meters) then tags can be added to the devices and points also utilizing the system library.

Figure 6:
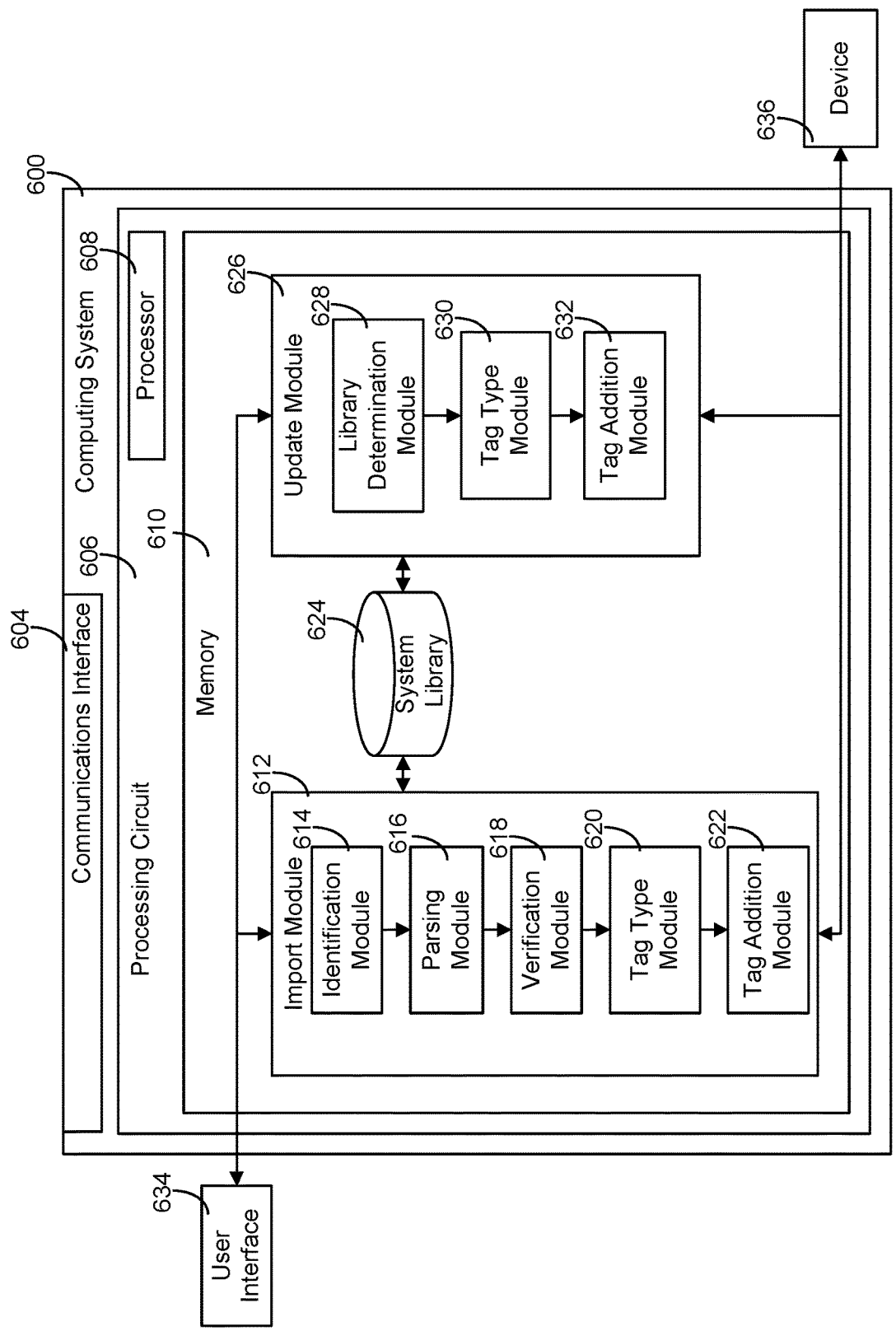
FIG. 6 is a block diagram of a controller which can be used in a BMS, according to some embodiments.

Referring now to FIG. 6, a block diagram showing a computing system 600 is shown, according to one embodiment. Computing system 600 can be a computing system or controller of the building management systems (BMS) described above with respect to FIGS. 1-5. Computing system 600 is shown to include a communications interface 604 and a processing circuit 606. Communications interface 604 may include wired or wireless interfaces (e.g., jacks, antennas, transmitters, receivers, transceivers, wire terminals, etc.) for conducting data communications with various systems, devices, or networks. For example, communications interface 604 may include an Ethernet card and port for sending and receiving data via an Ethernet-based communications network and/or a WiFi transceiver for communicating via a wireless communications network. Communications interface 604 may be configured to communicate via local area networks or wide area networks (e.g., the Internet, a building WAN, etc.) and may use a variety of communications protocols (e.g., BACnet, IP, LON, etc.).

Communications interface 604 may be a network interface configured to facilitate electronic data communications between computing system 600 and various external systems or devices (e.g., user interface 634, device 636). Computing system 600 may receive tag update commands from user interface 634 and device information (e.g., an indication that a new device has been added) from device 636. Computing system 600 may be configured to output user input requests to user interface 634.

Processing circuit 606 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 606 and may include computer code for executing (e.g., by processor 608) one or more processes described herein.

In some embodiments, computing system 600 includes a system library 624 containing data as described herein, which can be run by software code regardless of whether the automatic tagging is done on import or thereafter. In some embodiments, the construction of the system library 624 can be enhanced for system library files to explicitly list the appropriate tags for the device and the points. For example, a "System Library Editor" and an existing spreadsheet that creates System Libraries can be enhanced to support the addition/modification/deletion of tagging data. In some situations, system library files can include PCT files (e.g., files corresponding to a programmable controller tool such as FX-PCT and FC-PCT) and/or WT4000 files (e.g., files corresponding to a BACnet device). The system library 624 can support adding tags at the device and at a point. The tags can be individual tags or tag groups.

In some embodiments of the present disclosure, systems and methods of automatic tagging of devices and points are configured using the Niagara software platform (e.g., Niagara 4). Accordingly, tags can be of the form "namespace:tag" where the namespace is the nickname used within Niagara to identify the tag dictionary. For example, "n:point" refers to the point tag in the Niagara tag dictionary. If the tag is a value tag, then the value is provided using an equal's sign. For example, "hs:stage=2" refers to the stage value tag in a Haystack tag dictionary and assigns it a value of 2. If multiple tags are to be assigned, they can be separated by a semicolon ("e.g., "hs:damper;hs:cmd"). Tag groups can also be supported. In some embodiments, the system library does not differentiate between tag groups and tags, so a tag group can be indicated as "namespace: taggroup" (e.g., "hs:zoneAirTemperatureSensor").

An enhanced system library header can contain any tags that should be added to the device by adding the tags xml attribute. In some embodiments, if this attribute is not present or has a blank value then no tags will be added. The non-limiting example tables below describe the details of the construction of FX system libraries, according to an example embodiment. The elements specific to automatic tagging are shown in bold.

TABLE 1

Structure of System Library Header - CAF File Import

| Field Name | Description | Example | Default |
|---|---|---|---|
| Description | Description of the system library. | FanCoil-Zoning | None |
| Author | Author of the system library | Milw | None |
| PCTVersion | Version of PCT that was used to construct the system library - in particular this is important for the BACoids used to identify the points. | 10.1 | None |
| Date | Date of the system library. | Jan. 18, 2019 | None |

Table 1 describes the fields for an application supported by a PCT system library. In this example, all of the fields are xml attributes.

TABLE 2

Structure of System Library for Point - CAF File Import

| Field Name | Description | Example | Default |
|---|---|---|---|
| BACoid | Unique Identifier of Object in the CAF file. The value −1 may be used to tag the device. | 2045 | None |
| Import | Flag (Y/N) to indicate if Object should be imported | | N |
| PCTPointName | Name of Object in CAF file | SF-C | None |
| FXName | Name of Control Point in FX Supervisor Database | SF-C | None |
| PointOrder | Integer used to order points in FX Supervisor Database. Lowest number of imported objects appears first. | | 10000 |
| Tags | List of zero, one or more tags that should be associated with the device or point. If blank, no tags. Each tag of the format namespace:tagname, or, if using a tag group, namespace:tagegroupname. If multiple tags are needed, they are separated by semicolons. If a value tag, the format is namespace:tagname=value. | hs:fan;hs:cmd | Blank |
| ExportTag | {Future} Flag (Y/N) to indicate if Control Point should be tagged for FX Server export in the FX Supervisor Database. | | N |
| Condition1 | A Bacoid. Used (along with Condition2) to conditionally import an object from a CAF file, if the Import flag is true. An empty value means import is unconditional. Multiple BACoids separated by commas are OR conditions. So 1234, 5678 means condition1 will be true if either BACoid 1234 or 5678 is in the CAF file. | | Empty |
| Condition2 | A Bacoid. Used (along with Condition1) to conditionally import an object from a CAF file, if the Import flag is true. An empty value means import is unconditional. Multiple BACoids separated by commas are OR conditions. So 1234, 5678 means condition1 will be true if either BACoid 1234 or 5678 is in the CAF file. | | Empty |
| Extensions/Schedule | Legacy. | | None |
| Extensions/Totalization | A flag (Y/N) to indicate if a totalization extension should be added to the point in the FX Supervisor database. | | N |
| Extensions/Alarm | A flag (Y/N) to indicate if an alarm extension should be added to the point in the FX Supervisor database | | N |
| Extensions/Trend/Interval | A flag (Y/N) to indicate if an interval trend extension should be added to the point in the FX Supervisor database | | N |
| Extensions/Trend/Interval_Time | Time, in minutes, for the interval trend. Only applicable if the Interval field value is T. | | 15 |
| Extensions/Trend/COV | A flag (Y/N) to indicate if a COV trend extension should be added to the point in the FX Supervisor database | | N |

TABLE 2-continued

Structure of System Library for Point - CAF File Import

| Field Name | Description | Example | Default |
|---|---|---|---|
| Extensions/Trend/COV_Tolerence | Tolerance for COV trend. Only applicable if the COV field value is T. | | 1 |
| Extensions/Alarm/... | {Future} | | |

Table 2 describes the fields for each Object in a PCT system library. In this example, all of the fields are xml attributes.

TABLE 3

Structure of System Library Header - WT4000 CSV File Import

| Field Name | Description | Example | Default |
|---|---|---|---|
| Description | Description of the system library. | Wireless Pneumatic Stat | None |
| Author | Author of the system library | Milw | None |
| WT4000Version | Version of WT4000 tools that were used to construct the system library - in particular this is important for the Modbus register values used to identify the points. | 1.0 | None |
| Date | Date of the system library. | Jan. 18, 2019 | None |

Table 3 describes the fields for the application supported by a WT4000 system library. In this example, all of the fields are xml attributes.

TABLE 4

Structure of System Library for Point - WT4000 CSV File Import

| Field Name | Description | Example | Default |
|---|---|---|---|
| ModbusRegister | An integer used to identify the point in the thermostat. This value, and, optionally, either Byte or Bit, serves to address the point in the thermostat. To tag devices the following special values may be used:<br>5000 - a gateway device<br>5159 - a MFM device<br>5145 - a MFR device<br>5161 - a MCR device<br>5160 - a MCM device | 57 | None |
| Byte | Optional. Either H or L or blank. If blank, it is not used to address the point in the thermostat. If H, refers to the high order byte in the Modbus register, if L the low order byte in the Modbus Register. | H | Blank |
| Bit | Optional. Either blank or two digits used to identify the bit in a register. If blank, it is not used to address the point in the thermostat. Otherwise, 00 is bit 0, 01 is bit 1 etc. | 01 | Blank |
| Import | Flag (Y/N) to indicate if Object should be imported | | N |
| ConfigToolName | Name of the point in the import file, with xxx used instead of the thermostat model number | WT_4000_xxx_ai_57 | None |
| FXName | String to be used as the name of the point in FX Supervisor. | ZN-T | None |
| FXDesc | String to be used as the description of the point in FX Supervisor. | Zone Temperature | None |
| PointOrder | Integer used to order points in FX Supervisor Database. Lowest number of imported objects appears first. | | 10000 |
| Tags | List of zero, one or more tags that should be associated with the device or point. If blank, no tags. Each tag of the format namespace:tagname, or, if using a tag group, namespace:taggroupname. If multiple tags are needed, they are separated by semicolons. If a value tag, the format is namespace:tagname=value. | hs:zone;hs:air; hs:temp;hs:sensor | Blank |

TABLE 4-continued

Structure of System Library for Point - WT4000 CSV File Import

| Field Name | Description | Example | Default |
| --- | --- | --- | --- |
| ExportTag | {Future} Flag (Y/N) to indicate if Control Point should be tagged for FX Server export in the FX Supervisor Database. | | N |
| Condition1 | A string to indicate if the point should be imported, if a point at this address exists or not in the import file. | | Empty |
| Condition2 | A string to indicate if the point should be imported, if a point at this address exists or not in the import file. | | Empty |
| Extensions/Schedule | Not used, legacy. | | None |
| Extensions/Totalization | A flag (Y/N) to indicate if a totalization extension should be added to the point in the FX Supervisor database. | | N |
| Extensions/Alarm | A flag (Y/N) to indicate if an alarm extension should be added to the point in the FX Supervisor database | | N |
| Extensions/Trend/Interval | A flag (Y/N) to indicate if an interval trend extension should be added to the point in the FX Supervisor database | | N |
| Extensions/Trend/Interval_Time | Time, in minutes, for the interval trend. Only applicable if the Interval field value is T. | | 15 |
| Extensions/Trend/COV | A flag (Y/N) to indicate if a COV trend extension should be added to the point in the FX Supervisor database | | N |
| Extensions/Trend/COV_Tolerence | Tolerance for COV trend. Only applicable if the COV field value is T. | | 1 |
| Extensions/Alarm/. . . | {Future} | | |

Table 4 describes the fields for each Object in a WT4000 system library. In this example, all of the fields are xml attributes.

Still referring to FIG. 6, computing system 600 is shown to include an import module 612. Import module 612 may be used to automatically tag devices and/or points upon file import. Import module 612 is shown in communication with user interface 634. Additionally, import module 612 is shown in communication with device 636. User interface 634 may be used to provide information to import module 612, such as tag information and/or device information. Import module 612 may communicate with user interface 634 to request additional input data from a user.

Similarly, computing system 600 is shown to include an update module 626. Update module 626 may be used to automatically update devices and/or points upon request (e.g., by a user). Update module 626 is shown in communication with user interface 634. Additionally, update module 626 is shown in communication with device 636. User interface 634 may be used to provide information to update module 626, such as a request to update tags. Update module 626 may communicate with user interface 634 to request additional input data from a user.

Import module 612 is shown to include an identification module 614, a parsing module 616, a verification module 618, a tag type module 620, and a tag addition module 622. Further, import module 612 may communicate with the system library 624. Identification module 614 may be used to identify a point or device (e.g., device 636), upon import, that can be tagged. Import module 612 may then communicate with system library 624 to determine any associated tags of the point or device. Parsing module 616 may detect if a string is in the tag attribute, and may then parse the string to process each tag, one at a time. For each tag, the indicated tag dictionary may be checked for the existence and type of the tag (e.g., marker, value, or tag group).

In some embodiments, the verification module 618 may then check to see if the tag is valid for that point (e.g., if the tag is already present, it is not added again). If the tag is valid, then tag type module 620 may interrogate the type to determine how to add the tag. If, for example, the tag is a marker or tag group, then tag addition module 622 may simply add the tag to the device or point. However, if the tag is a value tag, for example, it may be added to the device or point and the value may be specified in the library that is associated with the tag.

Update module 626 is shown to include a library determination module 628, a tag type module 630, and a tag addition module 632. Further, update module 626 may communicate with system library 624. Library determination module 628 may be used to determine what, if any, library was used upon import for the specific point or device. Update module 626 may communicate with a library (in some cases, system library 624) to determine any associated tags of the point or device. Next, tag type module 620 may interrogate the type to determine how to add the tag. If, for example, the tag is a marker or tag group, then tag addition module 622 may simply add the tag to the device or point. However, if the tag is a value tag, for example, it may be added to the device or point and the value may be specified in the library that is associated with the tag.

Figure 7:
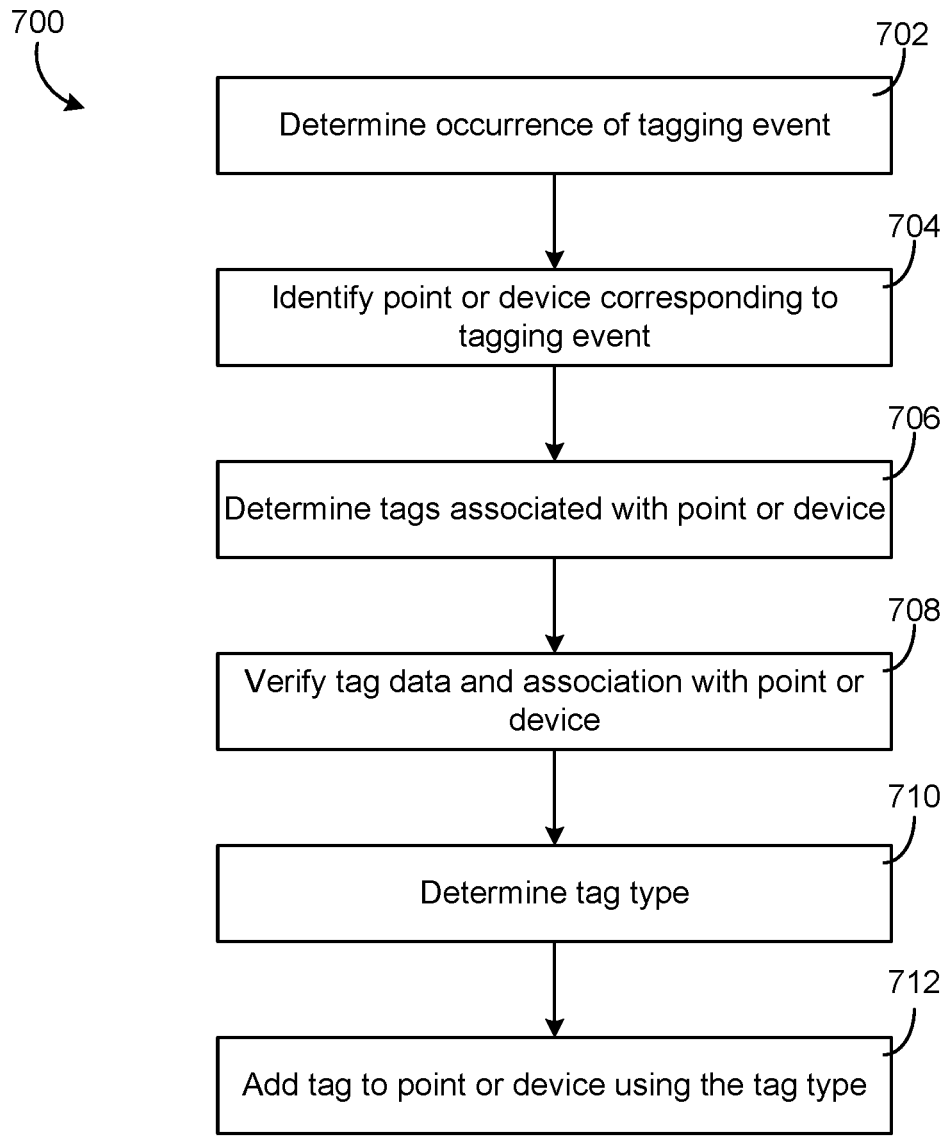
FIG. 7 is a flowchart of a method for tagging devices and/or points, according to some embodiments.

Referring now to FIG. 7, a flow chart of a method 700 for automatic tagging is shown, according to an example embodiment. In some embodiments, the method 700 is performed by computing system 600. Alternatively, the automatic tagging method 700 may be partially or completely performed by another computing system or controller. Method 700 is shown to include determining an occurrence of a tagging event (step 702). In some embodiments, the tagging event may correspond to a new device or point file import. Additionally, in some embodiments, the tagging event may correspond to a user request to update existing device or point tags. The user request may occur via a user interface, as described above. Alternatively, the tagging event may correspond to a different controller input.

Method 700 is shown to include identifying a point or device corresponding to the tagging event (step 704). In some embodiments, the identification may include locating a point or device ID, for example, in a corresponding library. In some situations, the corresponding library may be the system library. Next, method 700 is shown to include determining tags associated with the point or device (step 706). In some embodiments, the determination may include using stored library tags. Method 700 is shown to include verifying tag data and the association with the point or device (step 708). This may include checking the point to see if the tag is valid for that point. As one non-limiting example, if a tag is already present, then it will not be added again.

Additionally, method 700 is shown to include determining the tag type (step 710). In some embodiments, the tag type can determine how to add the tag to the point or device. As one non-limiting example, the tag may be a marker, tag group, or value tag. Next, method 700 is shown to include adding the tag to the point or device using the tag type (step 712). In one example, if the tag is a marker or tag group, it may be simply added to the point or device. As another example, if the tag is a value tag, it may be added to the point or device and the value specified in the library may be associated with the tag.

In some embodiments, the method of automatically tagging upon import may be done either when the points are added to a device on import of CAF files (e.g., either BACnet or N2) and CSV files for BACnet WT 4000, or on demand on a per device basis using a user interface (e.g., a tabular user interface). In either case, the tags may be held in the system library. In the case of import, the tags may be applied along with other library information at the time of import. When adding tags to a device and its points that already exist on a station, the library may also be used.

Before any parsing of the file takes place, the station may be checked by the tag dictionary service. If it is not present, then tags may not be added. In some embodiments, tags can be added to control points and/or the device.

Figure 8:
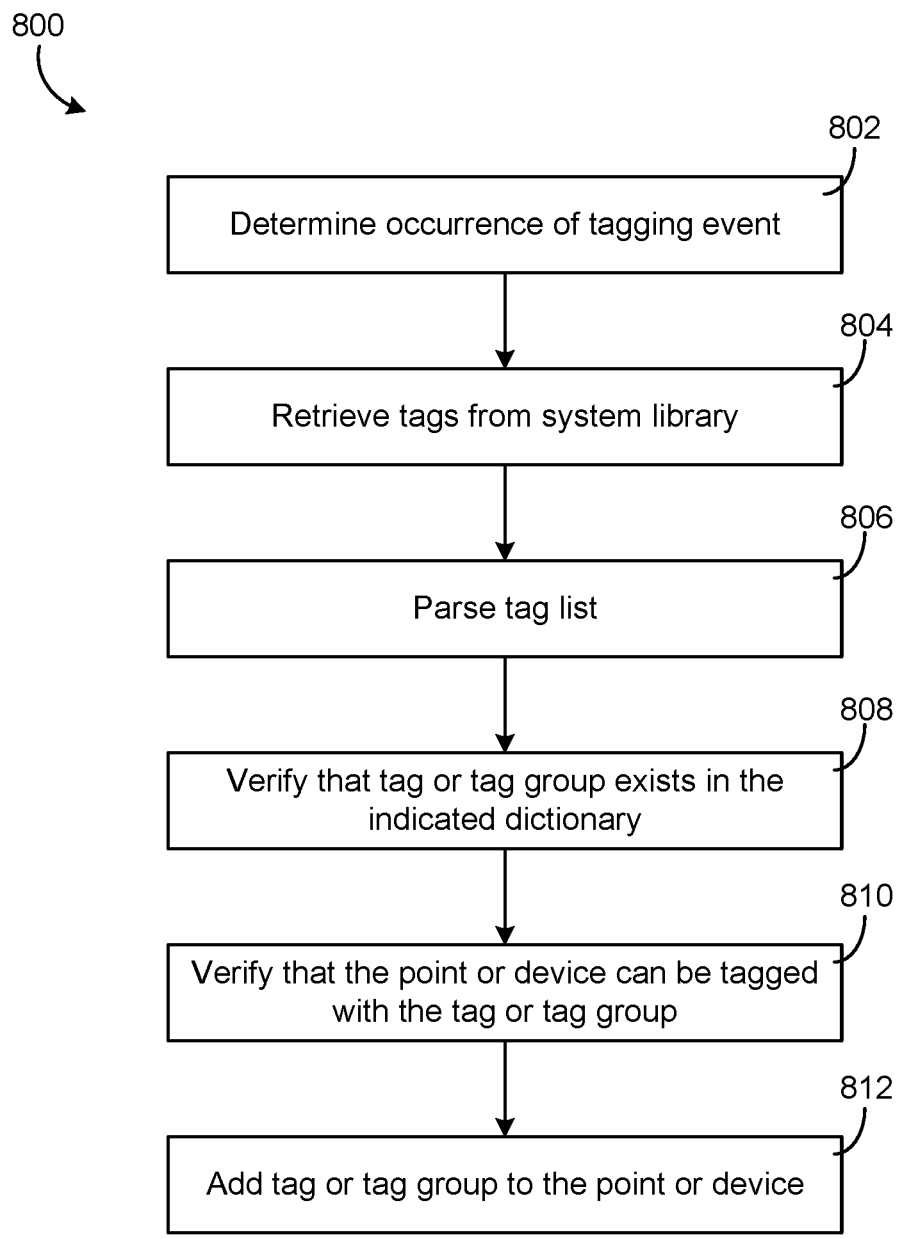
FIG. 8 is a flowchart of a method for tagging devices and/or points, according to some embodiments.

Referring now to FIG. 8, a flow chart of a method 800 for automatic tagging is shown according to an example embodiment. In some embodiments, the method 800 may be performed by the computing system 600. Alternatively, the automatic tagging method 800 may be partially or completely performed by another computing system or a controller.

Method 800 is shown to include determining an occurrence of a tagging event (step 802). In some embodiments, the tagging event may correspond to a new device or point file import. Additionally, in some embodiments, the tagging event may correspond to a user request to update existing device or point tags. The user request may occur via a user interface, as described above. Alternatively, the tagging event may correspond to a different controller input.

Method 800 is shown to include retrieving tags from the system library (step 804). In some embodiments, this may include identifying a point or device corresponding to the tagging event, and using the system library to look up or retrieve corresponding tags. Next, method 800 is shown to include parsing the tag list (step 806). In some embodiments, if there is a string in the tags attribute, then the string may be parsed to process each tag, one at a time.

Additionally, method 800 is shown to include verifying that the tag or tag group exists in the indicated dictionary (step 808). In some embodiments, this may include checking for the type of the tag (e.g., marker, value, or tag group). Method 800 is shown to include verifying that the point or device can be tagged with the tag or tag group (e.g., the point or device is checked to see if the tag or tag group is valid for that point) (step 810). Next, method 800 is shown to include adding the tag or tag group to the point or device (step 812). The addition of the tag or tag group may be carried out using a plurality of methods. In some embodiments, the methods of adding the tag or tag group may be based on the type of the tag or tag group.

Figure 9:
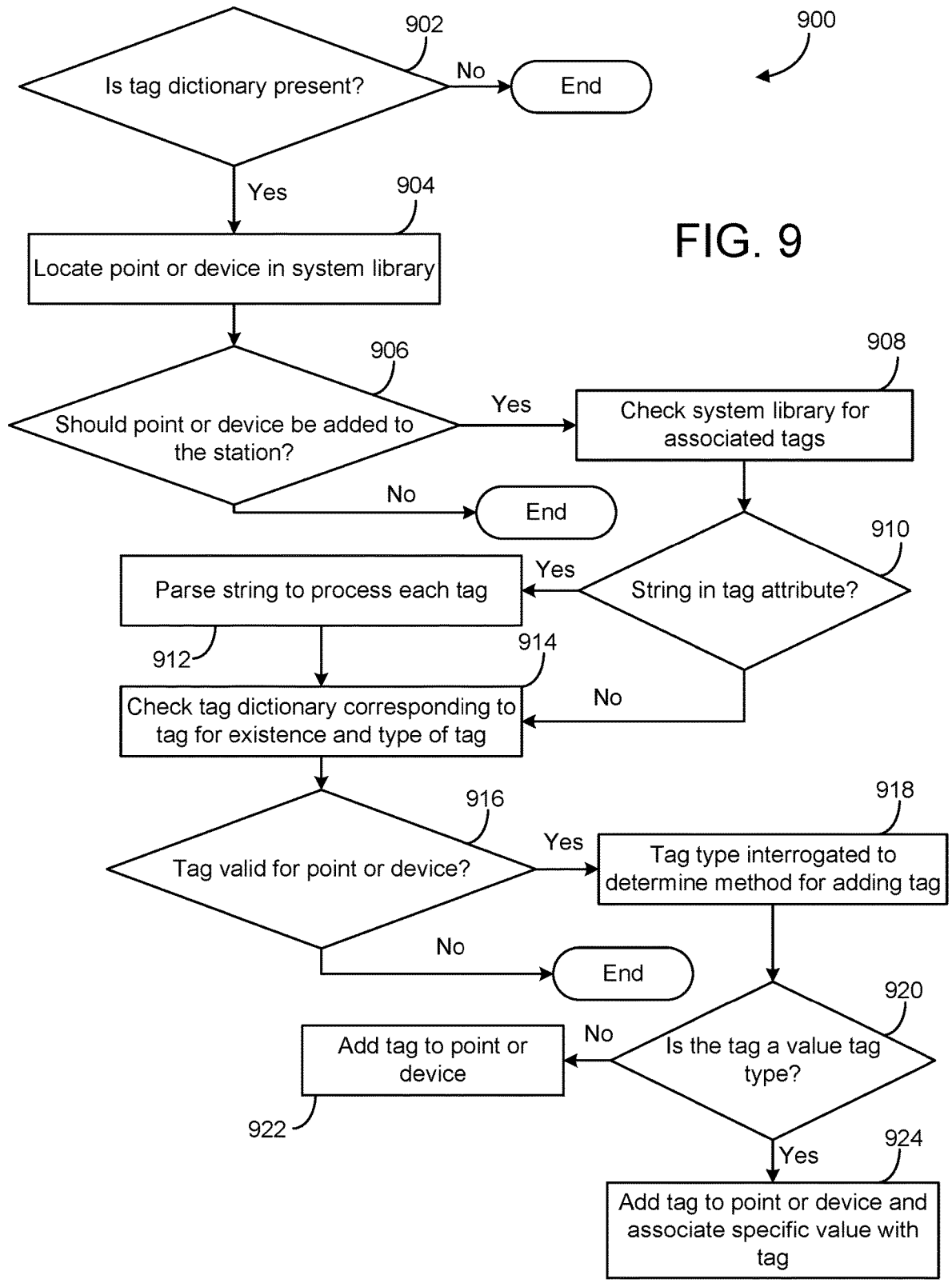
FIG. 9 is a flowchart of a method for tagging devices and/or points upon import, according to some embodiments.

Referring now to FIG. 9, a flow chart of a method 900 for automatic tagging upon import is shown, according to an example embodiment. In some embodiments, the method 900 is performed by the computing system 600. Alternatively, the method 900 may be partially or completely performed by a different computing system or controller. The method 900 is shown to include determining if a tag dictionary is present (step 902). If the tag dictionary is not present (i.e., the result of step 902 is "no"), method 900 ends. Alternatively, if the tag dictionary is present (i.e., the result of step 902 is "yes"), a point or device may then be located within the system library (step 904).

Method 900 is shown to include determining if the point or device should be added to the station (step 906). If the point or device should not be added to the station (i.e., the result of step 906 is "no"), method 900 ends. Alternatively, if the point or device should be added to the station (i.e., the result of step 906 is "yes"), the system library may be checked for associated tags (step 908). Method 900 may then determine if the tag attribute contains a string (step 910). If the tag attribute contains a string (i.e., the result of step 910 is "yes"), the string may be parsed to process each tag (step 912), prior to checking the tag dictionary corresponding to the tag for the existence and type of the tag (step 914). If the tag attribute does not contain a string (i.e., the result of step 910 is "no"), then method 900 may include checking the tag dictionary corresponding to the tag for the existence and type of the tag (step 914).

Method 900 is shown to include determining if the tag is valid for the point or device (step 916). If the tag is not valid for the point or device (i.e., the result of step 916 is "no"), method 900 may end. Alternatively, if the tag is valid for the point or device (i.e., the result of step 916 is "yes"), the tag type may then be interrogated to determine a method for adding the tag (step 918). Next, method 900 may include determining if the tag is a "value" tag type (step 920). If the tag type is a value tag (i.e., the result of step 920 is "yes"), the tag may be added to the point or device and a specific value may be associated with the tag (step 924). If the tag type is not a value tag (i.e., the result of step 920 is "no"), the tag may be added to the point or device (step 922).

In some embodiments, existing devices may be automatically tagged. Similar to the tagging on import functionality, the tags themselves may be associated with devices and points in a system library. The decisions involved may include determining how the appropriate system library is selected and how the tags and points in the station are matched.

Figure 10:
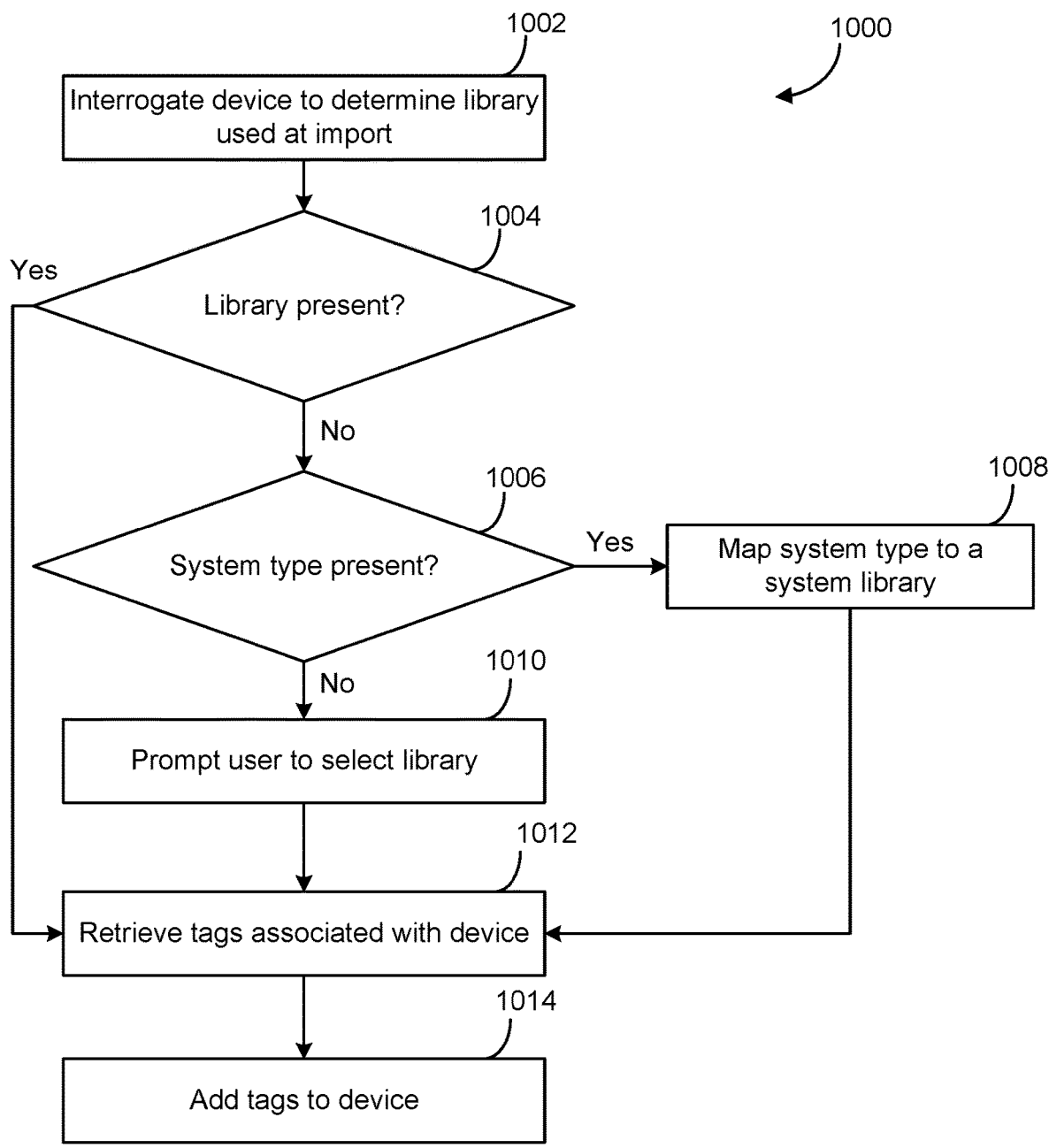
FIG. 10 is a flowchart of a method for updating device and/or point tags, according to some embodiments.

Referring now to FIG. 10, a flow chart of a method 1000 for updating existing points and/or devices is shown, according to an example embodiment. Method 1000 may be performed by computing system 600. Alternatively, method 1000 may be partially or completely performed by another computing system or controller. The method 1000 is shown to include interrogating a device to determine if a library was used at import (step 1002). If a library is present (i.e., the result of step 1004 is "yes"), then tags that are associated with the device may be retrieved from the library (step 1012). If a library is not present (i.e., the result of step 1004 is "no"), then it may be determined if a system type is present (step 1006). If a system type is present (i.e., the result of step 1006 is "yes"), then the system may be mapped to a system library (step 1008). Next, method 1000 may include retrieving the tags associated with the device from the system library (step 1012). If a system type is not present (i.e., the result of step 1006 is "no"), then the user may be prompted to select a library (step 1010) prior to retrieving tags associated with the device (step 1012). Once tags have been retrieved that are associated with the device (step 1012), method 1000 may include adding the tags to the device (step 1014).

In some embodiments, if the device is a BACnet device, then the BACnet point instance numbers may be used to find the point in the library. In some embodiments, tags associated with the first match may be retrieved and added to the point—since the original resource file that was imported is not known, the conditions within the file may not be applied.

In some embodiments, if the device is not a BACnet device, then the display name of the point in the station may be compared against the FXName in the system library. In some embodiments, when they are equal, any tags may be applied. Just as with the BACnet points, the first match may be used.

Figure 11:
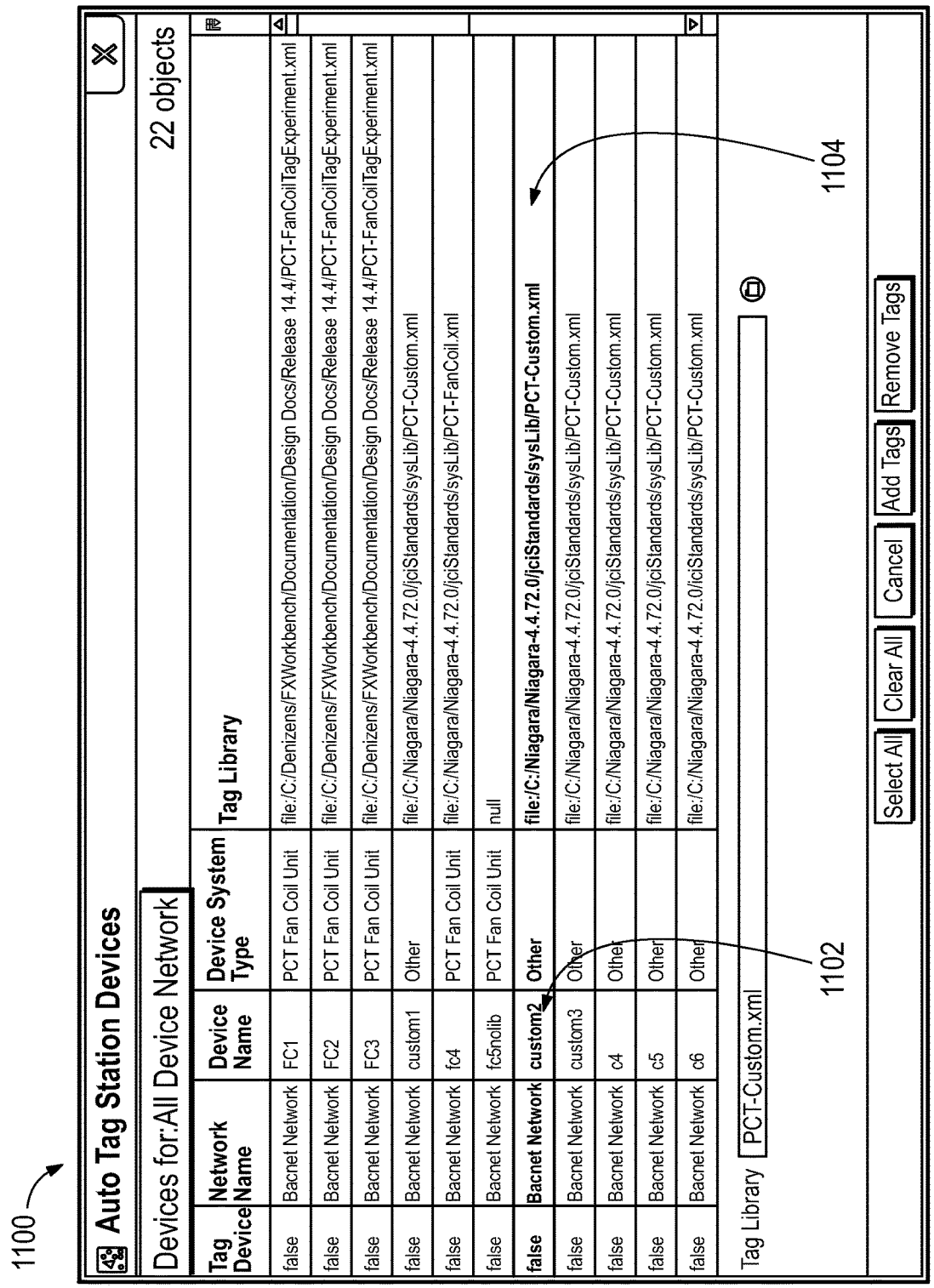
FIG. 11 is an image of an example interface for automatic tagging of devices, according to some embodiments.

Referring now to FIGS. 11-13, several example user interfaces are shown, according to an example embodiment. As shown by FIG. 11, a user interface 1100 of a manager may support tagging activities at the device level for devices that exist in the station. The manager may display a table of all of the devices in the station. In some embodiments, the user interface 1100 is configured to allow a user to select all devices using a button or select devices individually in the table. A Clear All button may deselect all selections. A selected device 1102 (e.g., "custom2") is shown as corresponding to a tag library field 1104 (e.g., "PCT-Custom").

In some embodiments, when one or more devices are selected, the user interface 1100 is configured to allow the user to add or remove tags from the devices and the control points they contain. In some embodiments, the Add Tags button may add tags to the devices and points and the Remove Tags button may remove the tags. In some embodiments, the Remove Tags button may not remove the implied tags that a software package (e.g., Niagara) automatically associates with various entities.

Referring to FIG. 12, a user interface 1200 of the system library editor may be configured to allow for adding of tags for system libraries that apply to PCT/CCT caf and WT4000 csv file import, for example. In some embodiments, PCT files may correspond to a programmable controller tool. In some embodiments, CCT files may correspond to a controller configuration tool. Further, in some embodiments, WT4000 files may correspond to a BACnet device. In some embodiments, an edit box may be added to the header tab for tags—this may contain any tags that should be applied to the device.

Referring to FIG. 13, a user interface 1300 of the system library shows adding a tags column to the points table and, when a point is selected for editing, a tags edit box may allow the user to associate tags with the point. These updates may apply to editing existing system libraries as well as creating a system library from a caf or a csv file. The associated spreadsheet may be enhanced to support adding tags at both the application and the point level, for example by adding the appropriate named ranges to the spreadsheets and enhancing the macros to write the tags to the generated system library file.

Example—Testing

The following describes a testing process example, according to some embodiments. In preparation for testing, a user may be prompted to select one PCT system library and the StatGateway system library with which to test the System library editor. In some embodiments, each of the selected items have no tags. The user may be promoted to make copies of each and save them with useful names in the install directory of Niagara. In some embodiments, the tag free libraries are used to fully test the system library editor.

In some embodiments, the user may select BACnet and N2 caf files as well as an original and a new WT4000 csv file for testing tagging on import. The user may add some devices using import with libraries without tags for testing the tagging of existing points. In some embodiments, the user may replace these libraries with the libraries with tags for the tags to be applied. The user may have non-BACnet devices to test the tag matching by name.

In some embodiments, testing the system library editor may include:
1. Start the system library editor and select the PCT library without tags and open it.
   a. On the Points tab the Tags column for all points may be blank.
2. Save the PCT library without tags using a different file name.
   a. Library may have the Tags attribute added to all points (if not there already) but may not have tags entries.
3. Start the system library editor. Select the StatGateway library without tags and open it.
   a. On the Points tab the Tags column for all points may be blank.
4. Save the StatGateway library without tags using a different file name.
   a. Library may have the Tags attribute added to all points (if not there already) but no tags entries.
5. Start the system library editor. Select a PCT library with tags and open it.
   a. On the Points tab the Tags column may contain tags for some of the points.
   b. On the Points tab the Tags column may contain an appropriate tag (e.g., hs:ahu) for BACoid with value −1, corresponding to the device.
6. Save the PCT library with tags using a different file name.
   a. Library may have the Tags attribute on all points and all of the tag entries.
7. Start the system library editor. Select the StatGateway library with tags and open it.
   a. On the Points tab the Tags column may contain tags for some of the points.
   b. On the Points tab the Tags column may contain an appropriate tag (e.g., hs:ahu) for ModbusRegister with value 5000, corresponding to the gateway device.
8. Save the StatGateway library with tags using a different file name.
   a. Library may have the Tags attribute on the header and all points and all of the tag entries.
9. Start the system library editor. Select the PCT system library that was saved in part 2 above. Edit the tags field of one or more points in the library but do not save it.
   a. Library may not have tags added to points.

10. Start the system library editor. Select the PCT system library that was saved in part 2 above. Edit the tags field of one or more points in the library and save it. Make a note of the points and tags that were added. One of the points may have multiple tags separated by a semicolon.
    a. Library may have tags added to the points.
11. Start the system library editor. Select the StatGateway system library that was saved in part 4 above. Edit the tags field of one or more points in the library but do not save it.
    a. Library may not have tags added to points.
12. Start the system library editor. Select the StatGateway system library that was saved in part 4 above. Edit the tags field of one or more points in the library and save it. Make a note of the points and tags that were added. One of the points may have multiple tags separated by a semicolon.
    a. Library may have tags added to the points.
13. Start the system library editor. Select a caf file to initially populate a library. Add tag(s) on one or more points on the point tab. Make a note of the tags that were added. Use the Save As button to save the library.
    a. Library may have tags added to the points.
14. Start the system library editor. Select an original WT 4000 csv file to initially populate a library. Add tag(s) on one or more points on the point tab. Make a note of the tags that were added. Use the Save As button to save the library.
    a. Library may have tags added to the points.
15. Start the system library editor. Select a new WT 4000 csv file to initially populate a library. Add tag(s) on one or more points on the point tab. Make a note of the tags that were added. Use the Save As button to save the library.
    a. Library may have tags added to the points.

Import Files:
1. Using the import manager, import a caf file using a system library that may have tags defined. Verify that tags that are present in the system library have been added to the device and appropriate points.
2. Using the import manager, import an original WT 4000 csv file using a system library that has tags defined. Verify that tags that are present in the system library have been added to the device and appropriate points.
3. Using the import manager, import a new WT 4000 csv file using a system library that has tags defined. Verify that tags that are present in the system library have been added to the device and appropriate points.
4. Run the same tests as in items 1-3 above, only this time use the system library files that were edited with the system library editor to add tags.

Tag Query

In some embodiments, the systems and methods described herein can be used to query tags. In some embodiments, search functionality may be case insensitive. In some embodiments, a case insensitive NEQL search may be implemented using Niagara (e.g., Niagara Search API).

Tag Conversion

In some embodiments, the systems and methods described herein can be used to automatically convert tags (e.g., adding or creating secondary tags) using a utility application. In some embodiments, features of the utility application can be implemented once tags have been previously created and/or added to devices, points, or other components within a station. In some embodiments, the new tags are configured or formatted for an alternate software platform, and/or use a different syntax as compared to the previously created tags. In some embodiments, the previously created tags may correspond to Niagara syntax, and the new tags may correspond to Haystack syntax. Accordingly, the new tags may be used to automate tagging within a separate software environment compatible with "Haystack" formats. In some embodiments, a software service may be installed prior to the generation of the new tags.

In some situations, the software service may be the Niagara4 nHaystack Service at Version 2.02 or later. In some embodiments, the secondary tagging features may correspond to a utility. The utility may be contained within the jciHaystackUtil.jar file. This JAR file may have a palette with a single component named "haystackUtil" that contains the Haystack Tagging Utility.

In some embodiments, the nHaystack Service may be added to the stations' services. Upon adding this service, the station may be restarted. Alternatively, the user may invoke an "initialize haystack" action either from the nHaystack Service or by clicking the "initialize" button from the "N Haystack Service View."

Figure 14:
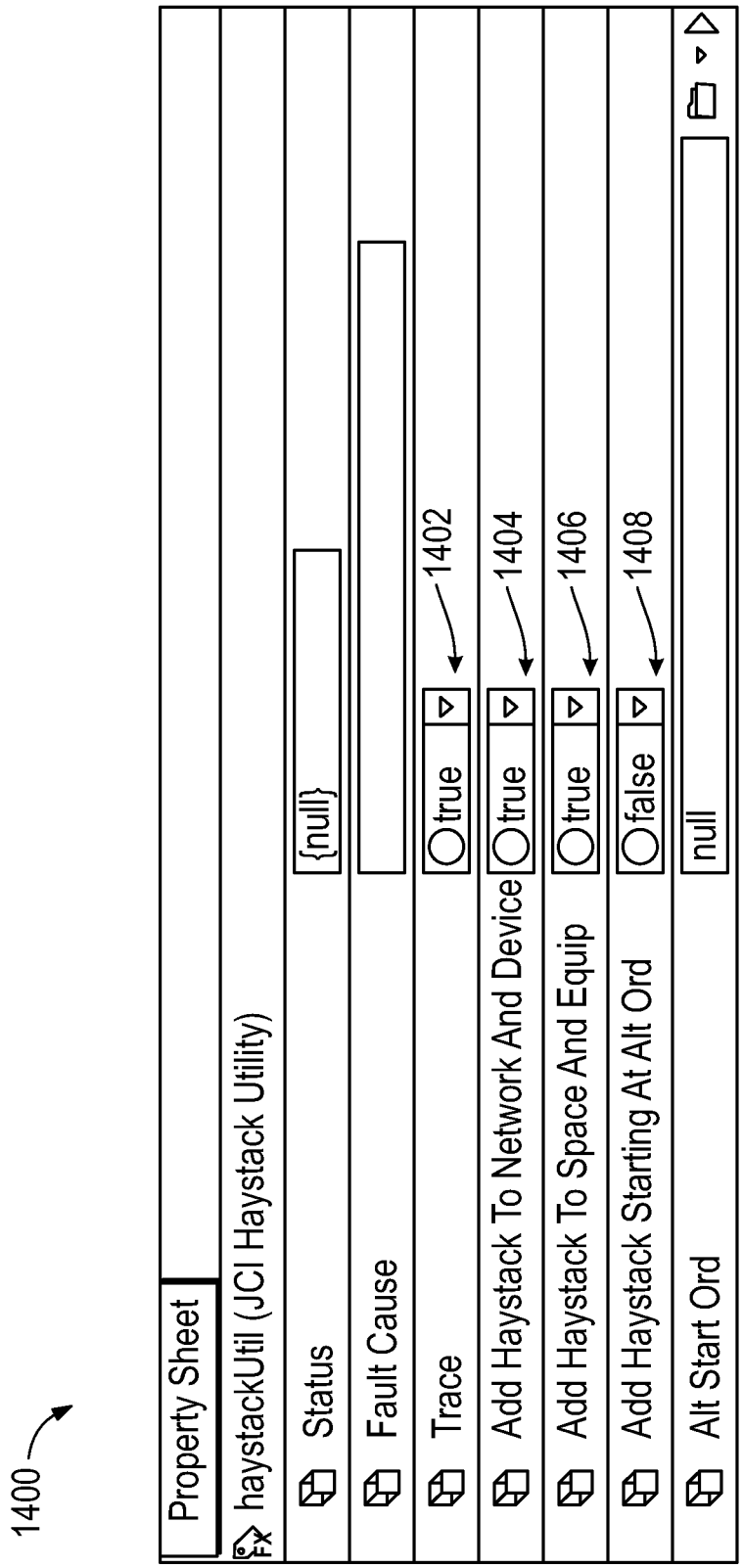
FIG. 14 is an image of an example interface for converting tag format, according to some embodiments.

Referring now to FIG. 14, a user interface 1400 of a utility configured for generating secondary tags (e.g., Haystack tags) from previously generated Niagara tags is shown. User interface 1400 may correspond to the "FX Haystack Utility."

The FX Haystack Utility may be utilized after adding direct tags to devices, points, and other components within a station. To run this Utility, the NHaystackService may be added to the Station and initialized before running. The "haystackUtil" component found in the jciHaystackUtil palette may be dragged from the palette to somewhere under the Station's Config node or one of the children of the Config node.

In some embodiments, when this component runs, a number of processes may happen automatically. The utility may check to see if a "site" component has already been added. In some embodiments, if there is no "site" component, the utility may automatically add one. It may be added to the "Config" node unless the utility sees a BJciSpaceRoot component and then it will add the "site" to this BJciSpaceRoot component.

In some embodiments, when the utility sees that the component being processed is a BDevice component, the utility may add the "equip" component to the device. It may also set the "siteRef" tag to point to the first "site" component found in the station. It may also check the device for any direct tags and add those tags to the "equip" haystack value.

In some embodiments, the FX Haystack Utility component (BJciHaystackUtility) may have a number of properties that govern how the component runs. For example, if the user wants to see a trace of what objects and tags are being processed in the application Director Console, the "Trace" property 1402 may be set to true. Setting this property to false may turn off messages other than Exceptions from being displayed in the Application Director Console.

The user may set the property "Add Haystack to Network and Device" 1404 to true to process all of the devices and points found in all of the defined networks. In some embodiments, when this property is set to false, then processing of the entire content of the Drivers node may be skipped.

The user may set the property "Add Haystack to Space and Equip" 1406 to true to process all of the space and equipment objects found in the station. In some embodiments, when this property is set to false, then processing of the space and equipment objects may be skipped. Herein, "space" may refer to a building, a campus, or other relevant space.

The user may set the property "Add Haystack Starting at Alt Ord" 1408 to true to process all of the components and the components children found starting at a specified ORD. In some embodiments, when this property is set to false, then processing of the specified ORD and its children may be skipped. This option may be useful when there are components in the station that are not part of a device, point, space or equipment, but the components do have direct tags added. This option may also be useful to process a narrow set of components without going through a large set of components such as setting the ORD to a newly added device. This option may only process the single device and its points and not process the entire drivers node.

In some embodiments, the user may initiate this utility by selecting (e.g., right-clicking) on the "haystackUtil" component and selecting "Actions\Build Haystack Tags." When the running of the utility is complete, the Status property may be updated as well as the Fault Cause. In some embodiments, if there was an issue, these two properties may indicate the cause of the error in the Status and Fault Cause properties. In some embodiments, the utility is configured to include a Reset action option that can be invoked to reset all of the component's properties to their default value.

In some embodiments, the FX Haystack Utility can be configured to run multiple times. For example, if direct tags within the Station are modified after this utility has been run initially, a user may simply invoke the "Build Haystack Tags" action and the haystack values may be refreshed with the direct tags found in the selected components.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for tagging entities in a building automation system (BAS), the method comprising:
    receiving, by a processing circuit, an indication to add one or more entities to the BAS, the indication identifying a system type;
    retrieving, by the processing circuit based on the system type, a system library mapping a plurality of tags to a plurality of entities;
    identifying, by the processing circuit, a first entity from the plurality of entities in the system library;
    determining, by the processing circuit, one or more tags associated with the first entity based on a lookup using the system library;
    determining, by the processing circuit, a tag type for each of the one or more tags based on a tag dictionary;
    comparing, by the processing circuit, the one or more tags to the plurality of tags in the system library; and
    adding, by the processing circuit, the one or more tags to the first entity based on the tag type of each of the one or more tags, wherein the processing circuit omits adding duplicate tags to the first entity based on the comparison.

2. The method of claim 1, wherein a user interface produces the indication to add the one or more entities to the BAS.

3. The method of claim 1, wherein the first entity comprises one of a space, a piece of equipment, a sensor, a device, or a point.

4. The method of claim 1, wherein the tag type is a value tag, wherein the value tag further comprises a numeric value associated with the first entity.

5. The method of claim 4, wherein the method further comprises adding, by the processing circuit, the numeric value to the first entity.

6. The method of claim 1, wherein the one or more tags comprise a tag dictionary indicator, the method further comprising retrieving, by the processing circuit, the tag dictionary based on the tag dictionary indicator.

7. The method of claim 1, the tag dictionary mapping a plurality of tag types to the plurality of tags.

8. A method for converting tag syntax in a building management system (BMS), the method comprising:
- receiving, by a processing circuit, a first tag corresponding to a first entity and having a first syntax and a system type;
- identifying, by the processing circuit based on the system type, a system library associated with the first entity, wherein the system library maps a plurality of tags to a plurality of entities; and
- initiating, by the processing circuit, an update process, the process comprising:
  - building one or more second tags corresponding to the first entity and having a second syntax based on a lookup using the system library, wherein building one or more second tags comprises;
  - comparing, by the processing circuit, the one or more second tags to the plurality of tags in the system library; and
  - omitting, by the processing circuit, duplicate tags based on the comparison.

9. The method of claim 8, wherein building the one or more second tags comprises:
- determining one or more second tags associated with the first entity based on the system library;
- determining a tag type for each of the one or more second tags based on a tag dictionary; and
- adding the one or more second tags to the first entity based on the tag type of each of the one or more second tags.

10. The method of claim 9, wherein the first entity comprises one of a space, a piece of equipment, a sensor, a device, or a point.

11. The method of claim 9, wherein the tag type is a value tag, wherein the value tag further comprises a numeric value associated with the first entity.

12. The method of claim 8, wherein the method further comprises adding, by the processing circuit, a numeric value to the first entity.

13. The method of claim 9, wherein each of the one or more second tags comprise a tag dictionary indicator, the method further comprising retrieving, by the processing circuit, the tag dictionary based on the tag dictionary indicator.

14. The method of claim 9, the tag dictionary mapping a plurality of tag types to the plurality of tags.

15. A building automation system (BAS) comprising:
- a system library corresponding to a system type and mapping a plurality of tags to a plurality of entities;
- a computing system comprising a processing circuit having a processor and memory coupled to the system library configured to perform a first import process, a second update process based on a lookup using the system library, and a verification process;
- wherein the first import process associates one or more tags with a first entity;
- wherein the second update process updates a first tag associated with a second entity by building one or more second tags; and
- wherein the verification process compares the one or more second tags to the first tag and omits duplicate tags based on the comparison.

16. The building automation system (BAS) of claim 15, wherein the first import process comprises:
- identifying the first entity in the system library;
- determining the one or more tags associated with the first entity based on the system library;
- determining a tag type for each of the one or more tags based on a tag dictionary; and
- adding the one or more tags to the first entity based on the tag type of each of the one or more tags.

17. The building automation system (BAS) of claim 15, wherein the second update process comprises:
- receiving the first tag corresponding to the second entity and having a first syntax;
- identifying a system type associated with the second entity, wherein the system type is associated with a plurality of relationships in the system library; and
- building one or more second tags corresponding to the second entity and having a second syntax.

18. The building automation system (BAS) of claim 17, wherein building the one or more second tags comprises:
- determining the one or more second tags associated with the second entity based on the system library;
- determining a tag type for each of the one or more second tags based on a tag dictionary; and
- adding the one or more second tags to the second entity based on the tag type of each of the one or more second tags.

19. The building automation system (BAS) of claim 18, wherein the tag type is a value tag, wherein the value tag further comprises a numeric value associated with the second entity.

20. The building automation system (BAS) of claim 15, wherein the first entity comprises one of a space, a piece of equipment, a sensor, a device, or a point.

* * * * *